(12) United States Patent
Nabar et al.

(10) Patent No.: US 8,494,084 B1
(45) Date of Patent: Jul. 23, 2013

(54) REUSE OF A MATRIX EQUALIZER FOR THE PURPOSE OF TRANSMIT BEAMFORMING IN A WIRELESS MIMO COMMUNICATION SYSTEM

(75) Inventors: Rohit Nabar, Sunnyvale, CA (US);
Kedar Shirali, Sunnyvale, CA (US);
Hui-Ling Lou, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 1353 days.

(21) Appl. No.: 11/598,563

(22) Filed: Nov. 13, 2006

Related U.S. Application Data

(60) Provisional application No. 60/796,847, filed on May 2, 2006.

(51) Int. Cl.
*H04L 25/49* (2006.01)

(52) U.S. Cl.
USPC ............................ 375/296; 375/260; 375/299

(58) Field of Classification Search
USPC .......................................... 375/260, 296, 299
See application file for complete search history.

(56) References Cited

U.S. PATENT DOCUMENTS

| | | | |
|---|---|---|---|
| 6,760,388 B2 | 7/2004 | Ketchum et al. | |
| 6,834,109 B1 | 12/2004 | Pare, Jr. et al. | |
| 7,065,146 B1 | 6/2006 | Lou et al. | |
| 7,333,540 B2 | 2/2008 | Yee | |
| 7,336,727 B2 | 2/2008 | Mukkavilli et al. | |
| 7,397,758 B1 | 7/2008 | Hart et al. | |
| 7,433,402 B2 | 10/2008 | Al-Dhahir et al. | |
| 7,616,695 B1 | 11/2009 | Sarrigeorgidis | |
| 7,639,759 B2 | 12/2009 | Chen | |
| 7,912,140 B2 | 3/2011 | Anholt et al. | |
| 8,223,872 B1 * | 7/2012 | Zhang et al. | 375/267 |
| 2002/0186762 A1 | 12/2002 | Xia et al. | |
| 2003/0108117 A1 * | 6/2003 | Ketchum et al. | 375/295 |
| 2004/0165684 A1 | 8/2004 | Ketchum et al. | |
| 2005/0041763 A1 | 2/2005 | Wang et al. | |
| 2005/0047515 A1 * | 3/2005 | Walton et al. | 375/267 |
| 2006/0045193 A1 | 3/2006 | Stolpman et al. | |
| 2006/0239366 A1 * | 10/2006 | Kim et al. | 375/260 |

(Continued)

FOREIGN PATENT DOCUMENTS

| | | |
|---|---|---|
| WO | WO-2007/035993 A1 | 4/2007 |
| WO | WO-2007/037716 A1 | 4/2007 |

OTHER PUBLICATIONS

Mujtaba, S., IEEE 802.11 Wireless LANs, "TGn Sync Proposal Technical Specification" (2005).

(Continued)

*Primary Examiner* — Shuwang Liu
*Assistant Examiner* — David Huang

(57) ABSTRACT

A beamforming technique used in a MIMO wireless transmission system determines a transmitter beamforming steering matrix using a matrix equalizer of a transmitter or a receiver within the MIMO communication system, to thereby increase the speed and/or to decrease the processing needed to implement effective beamforming within the transmitter of the communication system. While this beamforming technique may not provide the best possible set of steering coefficients that obtain the best possible transmission and reception in the communication system, this technique can provide increased performance over no beamforming without significantly increasing the processing overhead of the transmission system. This beamforming technique can used when a transmitter, with multiple transmitter antennas, is used to communicate with one or with multiple receivers within the communication system.

18 Claims, 8 Drawing Sheets

U.S. PATENT DOCUMENTS

| | | | |
|---|---|---|---|
| 2006/0270352 A1* | 11/2006 | Webster et al. | 455/63.4 |
| 2006/0274849 A1 | 12/2006 | Ketchum et al. | |
| 2007/0165737 A1 | 7/2007 | Sarrigeorgidis | |
| 2007/0206626 A1 | 9/2007 | Lee et al. | |
| 2007/0226287 A1 | 9/2007 | Lin et al. | |
| 2007/0258536 A1 | 11/2007 | Kim et al. | |
| 2008/0014870 A1 | 1/2008 | Kim | |
| 2008/0165875 A1 | 7/2008 | Mundarath et al. | |
| 2008/0266176 A1* | 10/2008 | Nabar et al. | 342/373 |
| 2009/0310656 A1 | 12/2009 | Maltsev et al. | |

OTHER PUBLICATIONS

IEEE Std 802.16a™-2003 (Amendment to IEEE Std. 802.16™-2001), "IEEE Standard for Local and Metropolitan area networks, Part 16: Air Interface for Fixed Broadband Wireless Access Systems—Amendment 2: Medium Access Control Modifications and Additional Physical Layer Specifications for 2-11 GHz," *The Institute of Electrical and Electronics Engineers, Inc.*, (2003).

IEEE P802.11g/D8.2, Apr. 2003 (Supplement to ANSI/IEEE Std 802.11 1999(Reaff 2003)), "IEEE P802.11g/D8.2, Draft Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," *Institute of Electrical and Electronics Engineers, Inc.*, (2003).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," the Institute of electrical and electronics Engineers, Inc., (1999).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

Non-Final Office Action mailed Apr. 27, 2011 (U.S. Appl. No. 12/111,129).

Non-Final Office Action mailed Aug. 9, 2011 (U.S. Appl. No. 12/098,222).

Sarrigeorgidis et al., U.S. Appl. No. 12/111,129, filed Apr. 28, 2008.

Zhang et al., U.S. Appl. No. 12/059,846, filed Mar. 31, 2008.

Zhang et al., U.S. Appl. No. 12/098,222, filed Apr. 4, 2008.

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

"IEEE P802.11n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

\* cited by examiner

REUSE OF A MATRIX EQUALIZER FOR THE PURPOSE OF TRANSMIT BEAMFORMING IN A WIRELESS MIMO COMMUNICATION SYSTEM

RELATED APPLICATION

This is a regular-filed application which is based on and claims priority to U.S. Provisional Patent Application Ser. No. 60/796,847, entitled "Reuse of Matrix Equalizer for the Purpose of Transmit Beamforming," which was filed on May 2, 2006, the entire disclosure of which is hereby incorporated by reference herein.

FIELD OF TECHNOLOGY

The present invention relates generally to wireless communication systems and, more particularly, to a system and method for beamforming while transmitting information in a multiple-input, multiple-output wireless communication system.

DESCRIPTION OF THE RELATED ART

An ever-increasing number of relatively cheap, low power wireless data communication services, networks and devices have been made available over the past number of years, promising near wire speed transmission and reliability. Various wireless technology is described in detail in the 802.11 IEEE Standard, including for example, the IEEE Standard 802.11a (1999) and its updates and amendments, the IEEE Standard 802.11g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16a IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining) and singular value decomposition (SVD). While it is known to perform beamforming in a MIMO system in a manner that uses all of the available receiver and transmitter antennas in the MIMO system, which thereby maximizes transmission reliability, the calculations and processing overhead associated with computing the beamsteering coefficients or the steering matrix increases significantly as the number of transmission and receiver antennas increases. As a result, beamforming in a MIMO system may significantly increase the system complexity and processing overhead when a large number of transmission and receiver antennas are present.

SUMMARY

A beamforming technique used in a MIMO wireless transmission system determines a transmit beamforming steering matrix using information developed by a matrix equalizer or reusing the hardware/software structure used to implement a matrix equalizer within the transmission system, to thereby increase the speed and/or to decrease the processing components needed to implement effective beamforming within the transmitter of the communication system. While this beamforming technique may not provide the best possible set of steering coefficients that obtain the best possible transmission and reception in the communication system, this technique can provide increased performance over no beamforming without significantly increasing the processing overhead of the transmission system. This beamforming technique can be used when a transmitter, with multiple transmitter antennas, is used to communicate with one or with multiple receivers within the communication system.

In one example, a method of wirelessly transmitting an information signal within a communication system having a transmitter with a plurality of transmission antennas and one or more receivers includes modulating the information signal to produce a modulated signal and providing the modulated signal to the plurality of transmission antennas for transmission to the one or more receivers. The method further develops a steering matrix using a matrix equalizer disposed in the transmitter or in one of the receivers and controls the transmission of the modulated signal via the transmission antennas using the steering matrix. If desired, developing the steering matrix may include computing the steering matrix using a matrix equalizer at the transmitter or at one of the receivers. In one case, computing the steering matrix may be performed using matrix equalizer coefficients developed by the matrix equalizer and in particular may include transposing the matrix equalizer coefficients developed by the matrix equalizer to form the steering matrix. Additionally, developing the steering matrix may include developing an intermediate beamforming measure such as an singular value decomposition (SVD) or a QR decomposition measure using the matrix equalizer. If desired, the intermediate beamforming measure may be determined by the matrix equalizer in the transmitter or may be determined by a matrix equalizer in one of the receivers, and may be sent from the one of the receivers to the transmitter, and may then be used at the transmitter to calculate the steering matrix for use in the transmitter.

In another embodiment, a wireless transmitter for transmitting an information signal to a plurality of receiver antennas associated with one or more receivers includes a signal modulator adapted to modulate the information signal to produce a modulated signal, a multiplicity of transmission antennas and a beamforming network coupled between the signal modulator and the multiplicity of transmission antennas. A controller is coupled to the beamforming network to control the beamforming network using a steering matrix so as to produce a transmit gain pattern having one or more high gain lobes when the modulated signal is transmitted via the multiplicity of transmission antennas. Additionally a matrix equalizer is disposed in the transmitter or in one of the receivers and a steering matrix calculation unit determines the steering matrix using the matrix equalizer.

In another embodiment, a wireless communication system includes a transmitter having a plurality of transmission antennas, one or more receivers, a multiplicity of receiver antennas associated with the one or more receivers and a signal modulator disposed within the transmitter and adapted to modulate an information signal to produce a modulated signal. A beamforming network is coupled between the signal modulator and the plurality of transmission antennas while a controller is coupled to the beamforming network to control the beamforming network using a steering matrix so as to produce a transmit gain pattern based on the steering matrix when the modulated signal is transmitted via the plurality of transmission antennas. In this case, a matrix equalizer is disposed in the transmitter or in one of the receivers to perform matrix equalization on a received signal and a steering matrix calculation unit is configured to determine the steering matrix using the matrix equalizer.

In yet another embodiment, a beamforming system for use in a wireless communication system having a transmitter with multiple transmission antennas and one or more receivers having a plurality of receiver antennas includes a computer readable memory and a routine stored on the computer readable memory for execution on a processor to determine a steering matrix using information developed by a matrix equalizer disposed within the transmitter or one of the receivers. The routine further applies the steering matrix to a signal to be transmitted via the multiple transmission antennas to thereby implement beamforming.

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards.

Figure 1:
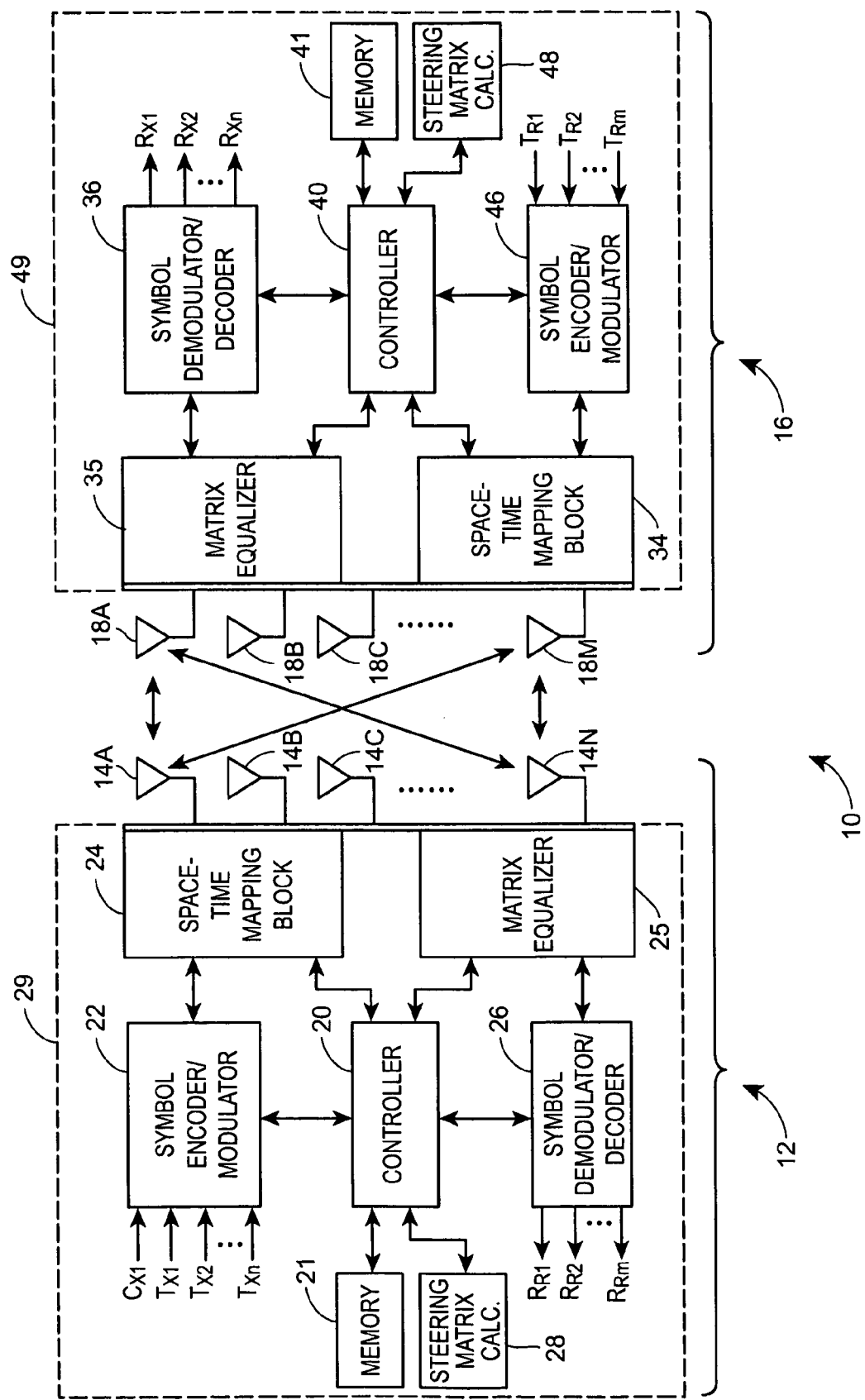
FIG. 1 is a block diagram of a wireless MIMO communication or transmission system that implements a transmitter beamforming technique using matrix equalizer information of a receiver.

Referring now to FIG. 1, a MIMO communication system 10 is illustrated in block diagram form as generally including a single transmitter 12 having multiple transmission antennas 14A-14N and a single receiver 16 having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28. The controller 12 may be any desired type of controller and both the controller 12 and the steering matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the steering matrix calculation unit 28, the space-time mapping block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. The same control signal or a different control signal may be used to determine the CSI for each frequency and/or spatial channel used in the MIMO communication system 10.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the space-time mapping block 24 or beamforming network processes the modulated signals by injecting delays and/or gains into the modulated signals based on a steering matrix provided by the controller 20, to thereby perform beamsteering or beamforming via the transmission antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In any event, a symbol demodulator and decoder unit 36, under control of a controller 40, may decode and demodulate the received symbol strings as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The encoded and modulated symbol stream may then be upconverted and processed by a space-time mapping block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40 may be stored in the memories 21 and 41.

As is generally known, beamforming or beamsteering typically includes applying appropriate phases and gains to the various signals as sent through the multiple transmitter antennas 14A-14N, in a manner with causes the signals sent from the different transmitter antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16.

To implement beamforming in the transmitter 12, the steering matrix calculation unit 28 may determine or calculate a set of matrix coefficients (referred to herein as a steering matrix) which are used by the space-time mapping block or beamforming network 24 to condition the signals being transmitted by the antennas 14A-14N. If desired, the steering matrix for any particular frequency channel of the MIMO system 10 may be determined by the steering matrix calculation unit 28 based on the CSI determined for that channel (wherein the CSI is usually developed by and sent from the receiver 16 but may instead be developed from signals sent from the receiver 16 to the transmitter 12 in the reverse link as an estimate of the forward link). Moreover, the steering matrix calculation unit 28 may use any desired beam steering or matrix computation techniques, such as transmit-MRC or SVD techniques, to compute the steering matrix. As these techniques are well known in the art, they will not be discussed in detail herein. Generally speaking, however, the complexity and number of computations that must be made to calculate the steering matrix increases as the number of transmission and/or receiver antennas increases.

Thus, as indicated above, the development of the steering matrix can be computationally expensive, and may require feedback (in the form of the CSI) from the receiver 16 to the transmitter 12, especially when there are numerous transmitter antennas and receiver antennas. When performing beamforming, it is optimal to develop the steering matrix using various known computational techniques based on the existence of all of the receiver and transmitter antennas. Such a steering matrix generally creates a transmit beam pattern having a high gain lobe directed to some combination of the receiver antennas as determined from, for example, the CSI. However, as the size of the number of receiver and transmitter antennas increases, the required feedback and number of calculations that need to be performed to develop the optimal steering matrix increases significantly (e.g., exponentially).

Figure 2:
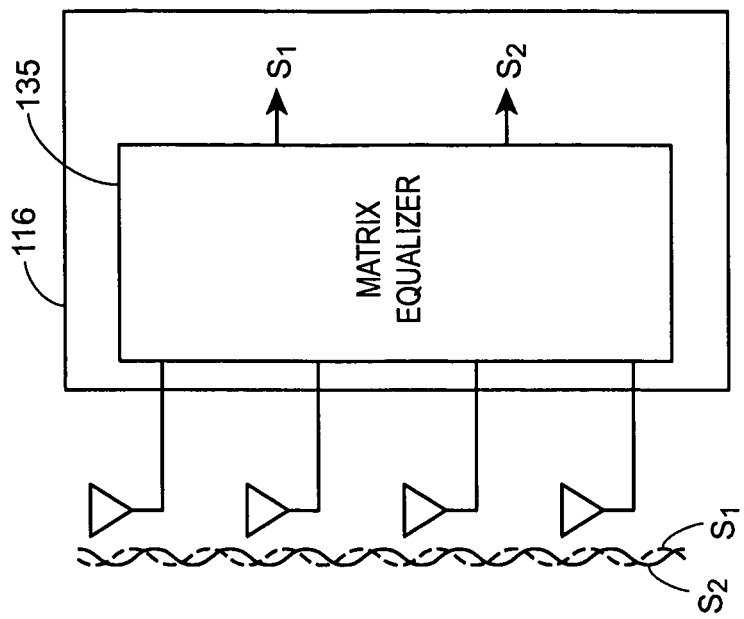
FIG. 2 is a block diagram illustrating a transmitter that transmits two signals to a receiver having a matrix equalizer that separates the two signals.
Figure 2:
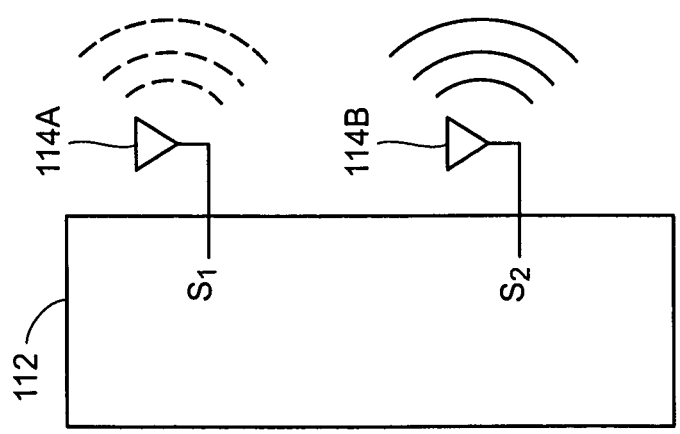

To increase efficiency and to reduce the computational load associated with determining the steering matrix, the system of FIG. 1 may develop a steering matrix using information and/or hardware or software used in either the receiver 16 or the transmitter 12 as part of the matrix equalizer functionality which ultimately reduces the computational load associated with beamsteering. In one example, the matrix equalizer coefficients determined for a particular receiver in recovering one or more signals from the transmitter may be used to develop a steering matrix to be used in the transmitter for beamforming to the receiver. For example, referring now to FIG. 2, when multiple signals such as signals $S_1$ and $S_2$ are transmitted via separate transmitter antennas 114A and 114B of a transmitter 112, the receiver 116 may use a matrix equalizer 135 to recover and separate the signals $S_1$ and $S_2$. The manner of developing the matrix equalizer coefficients in a receiver are well known and thus will not be described in detail herein. Generally speaking, however, it is possible to use a zero-forcing equalizer, a minimum mean square error equalizer, a decision feedback equalizer, a maximum likelihood equalizer or any other suitable equalizer technique to form the matrix equalizer coefficients within the receiver 116. However, it has been determined that, at least in some conditions, an acceptable steering matrix may be developed for the transmitter 112 using the matrix equalizer coefficients or other information pertaining to the matrix equalizer 135 of the receiver 116. In particular, a steering matrix for the transmitter 112 may be developed as the transpose of the matrix equalizer coefficients of the receiver 116. In this case, the steering matrix may be determined within, for example, the steering matrix calculation unit 48 of the receiver 16 (of FIG. 1) as the transpose of the matrix equalizer coefficients used in the matrix equalizer 35 of FIG. 1 and may then be sent to the transmitter 12 of FIG. 1 for use in beamforming to the receiver 16. On the other hand, the matrix equalizer coefficients or other indications of the matrix equalizer used within the receiver 16 may be sent from the receiver 16 to the transmitter 12 of FIG. 1, and the steering matrix calculation unit 28 may then determine the steering matrix to be used in the space-time mapping block 24 for beamforming to the receiver 16 based on the matrix equalizer coefficients used within the receiver 16. As will be understood, the determination of a transpose of the matrix equalizer coefficients will be computationally less expensive than determining the steering matrix using other known techniques, such as SVD and transmit-MRC, for the same number of receiver antennas. In another example, the transmitter 12 may use information pertaining to the matrix equalizer 25 within the transmitter 12 to form a steering matrix to be used to beamform from the transmitter 12 to the receiver 16. In this case, the transmitter 12 may develop the matrix coefficients for the matrix equalizer 25 using any standard or desired technique based on the receipt of a known signal from the receiver 16 sent via the reverse link. The transmitter 12 may then use these matrix equalizer coefficients determined at the transmitter 12 for the reverse link as an estimate of the matrix equalizer coefficients used by the receiver 16 in the forward link (i.e., as an estimate of the matrix equalizer coefficients developed by the receiver 16 for the matrix equalizer 35) and develop the steering matrix for use in beamforming in the forward link using this estimated set of matrix equalizer coefficients. Here again, in this case, the transmitter 12 may form the steering matrix as the transpose of the matrix coefficients developed for the matrix equalizer 25.

However, if desired, the transmitter 12 may use other information or structure (such as computational mechanisms) pertaining to or associated with a matrix equalizer within the communication system in other manners besides simply using the output of the matrix equalizer, e.g., by transposing the matrix coefficients of the receiver or transmitter matrix equalizer. For example, the transmitter 12 (or the receiver 16) may develop the steering matrix as some function of a matrix equalizer output or may even use the computational structure of the matrix equalizer to perform beamforming operations independent of the matrix equalizer computations.

Here, it is useful to note that the matrix equalizer (of the receiver 16 for example) acts on the estimate of the channel CSI to determine matrix coefficients that help equalize (separate) the (multiple) transmitted signals. A matrix equalizer is an essential component of any MIMO communication system, and is needed for a receiver to recover the transmitted signals. Thus, the computational mechanisms used to perform matrix equalization are needed within the receiver hardware components of a MIMO communication system. However, beamforming is an optional technique, and thus any structure added to perform beamforming adds to the cost and computational load of the hardware/software components of the MIMO communication system. However, because both matrix equalization and beamforming are essentially matrix operations, some of the computing structure provided to implement matrix equalization may be used to implement or perform beamforming or beamsteering operations, thereby enabling both of these operations to be performed using common hardware/software or other computational mechanisms.

For example, an SVD algorithm is often used by a matrix equalizer to determine the equalizer coefficients. In this respect, this same algorithm, or components thereof, may be used to perform beamforming computations, thereby reducing or eliminating the need to provide this structure or algorithm separately for use in beamforming. As another example, the matrix equalizer often uses a QR decomposition algorithm to determine the equalizer coefficients, and this QR decomposition algorithm may be reused to perform beamforming computations.

Thus, based on the discussion provided above, it is possible to use the computational structure of a matrix equalizer within a MIMO communication system to perform at least some aspects of the transmit beamforming or beamsteering operations. In this case, the transmit beamforming operations using matrix equalizer structure can be performed in either a receiver or a transmitter of the transmitter/receiver pair in which transmit beamforming is to be used in sending signals from the transmitter to the receiver of the transmitter/receiver pair. In one case, the steering matrix calculation unit 28 or 48 may use some of the computational structure of the associated matrix equalizer 25 or 35 to compute a beamforming measure, such as a channel SVD measure or a QR decomposition measure or any other calculation needed for beamforming and then may use this beamforming measure to calculate the steering matrix. In the case in which the matrix equalizer 35 of the receiver 16 is used to perform calculations for transmit beamforming within the transmitter 12, the processing using the matrix equalizer 35 is performed in the receiver 16 to develop the beamforming measure or to develop the steering matrix itself, and the beamforming measure or the steering matrix itself may be sent to the transmitter 12. On the other hand, if the matrix equalizer 25 of the transmitter 12 is used to perform beamforming calculations for transmit beamforming within the transmitter 12, the beamforming calculations may of course be made on information regarding the reverse link collected at the transmitter 12, or on information sent to the transmitter 12 (such as CSI) from the receiver 16. In this case, the matrix equalizer 25 may be used to develop a beamforming measure and the steering matrix calculation unit 28 may then develop the steering matrix from the beamforming measure. Of course, in this case, it will be understood that the beamforming computations made using the structure or algorithms of the matrix equalizer 25 may produce coefficients or other information not related in any way to the coefficients required for equalization of a transmitted signal.

In any event, as discussed above, the matrix equalizer 35 (of the receiver 16) or the matrix equalizer 25 (of the transmitter 12) may be used to perform beamforming calculations for the performing transmit beamforming between the transmitter 12 and the receiver 16. If the matrix equalizer 35 of the receiver 16 is used to perform these beamforming calculations, the steering matrix calculation unit 48 may, for example, use the structure of the matrix equalizer 35 to develop any appropriate intermediate information needed for determining the transmit steering matrix, such as the SVD information, the QR decomposition information, etc. The steering matrix calculation unit 48 may then send this intermediate information to the transmitter 12 for use by the steering matrix calculation unit 28 in forming the transmit steering matrix. On the other hand, if desired, the steering matrix calculation unit 48 may actually form the transmit steering matrix from the intermediate information developed using the matrix equalizer 35 and send this steering matrix to the transmitter 12. Alternatively, if the matrix equalizer 25 of the transmitter 12 is used to perform beamforming calculations, the steering matrix calculation unit 28 of the transmitter 12 may use the structure or algorithms of the matrix equalizer 25 to develop the intermediate information such as the SVD or the QR decomposition information, and then develop the transmit steering matrix from this information. The steering matrix calculation units 28 and 48 may, of course reuse as much of the components and structure of the matrix equalizers 25 and/or 35 as possible or desired in computing the transmit steering matrix for use by the transmitter 12.

Using information pertaining to a matrix equalizer in a receiver to determine the steering matrix used by a transmitter to perform beamforming in the transmission of a signal to the receiver reduces the computations associated with forming the steering matrix, may reduce the amount of feedback that must be sent from the receiver 16 to the transmitter 12 in the form of, for example, CSI, used to perform beamforming, may reduce the complexity of the hardware and/or the software used to implement the transmitter 12 and may also increase the speed at which the transmitter 12 is able to transmit information or adapt to new channel conditions based on the receipt of new or updated CSI.

Figure 3:
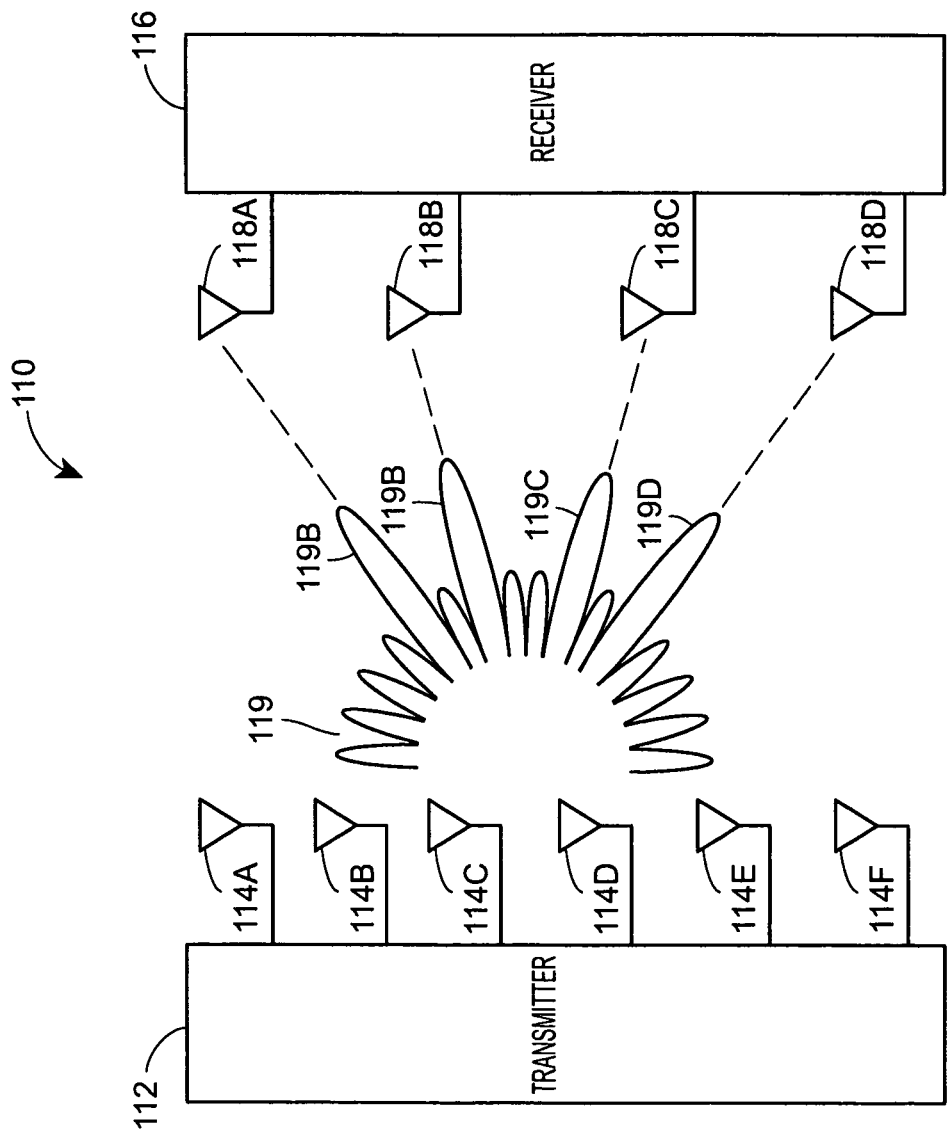
FIG. 3 is a block diagram illustrating a transmit gain pattern for wireless communications between a single transmitter and a single receiver using a transmitter beamforming technique that incorporates the use of receiver matrix equalizer information.

To illustrate the beamforming technique described herein, FIG. 3 shows a MIMO communication system 110 having a single transmitter 112 with six transmission antennas 114A-114F, and a single receiver 116 with four receiver antennas 118A-118D. In this example, the steering matrix is developed by the transmitter 112 using feedback indicative of the matrix equalizer output or matrix equalizer coefficients used in the receiver 116 to create a transmit gain pattern 119 as shown disposed next to the transmitter 112. As illustrated in FIG. 3, the transmit gain pattern 119 includes multiple high gain lobes 119A-119D disposed in the directions of the receiver antennas 118A-118D. The high gain lobes 119A-119D are orientated in the directions of propagation from the transmitter 112 to the particular receiver antennas 118A-118D while lower gain regions, which may even include one or more nulls, are produced in other directions of propagation. While FIG. 3 illustrates a separate high gain lobe directed to each of the receiver antennas 118A-118D, it will be understood that the actual gain pattern produced by the beam steering matrix calculations using information pertaining to the matrix equalizer of the receiver 116 may not necessarily include a separate high gain lobe for each of the receiver antennas 118A-118D. Instead, the gain pattern developed by the beam steering matrix for the transmitter 112 may have a single high gain lobe covering or directed generally to more than one of the receiver antennas 118A-118D. Thus, it is to be understood that the beam pattern resulting from the creation of a steering matrix using information pertaining to the matrix equalizer of the receiver may or may not have separate high gain lobes separated by low gain regions or nulls for each of the receiver antennas.

Of course, developing the beam pattern 119 to have high gain regions and low gain regions based on the matrix equalizer of the receiver 116 may be performed in any desired manner and location. For example, any of the components within the receiver 16 of FIG. 1, including the controller 40 and the steering matrix calculation unit 48 may determine the SVD or other information from the output of the matrix equalizer 35 and may then send this information and/or the matrix equalizer coefficients to the transmitter 12. In this case, the controller 20 or the steering matrix calculation unit 28 within the transmitter 12 may use the information determined from the matrix equalizer output or the matrix equalizer coefficients to determine the steering matrix for use in the space-time mapping block 24 for performing beamforming to the receiver 16. If the transmitter 12 receives the matrix equalizer coefficients from the receiver 16, the controller 20 or the steering matrix calculation unit 28 may transpose these coefficients to develop the steering matrix. On the other hand, the controller 40 or the steering matrix calculation unit 48 within the receiver 16 may use the information determined from the matrix equalizer output or the matrix equalizer coefficients of the matrix equalizer 35 within the receiver 16 to determine the steering matrix for use in the space-time mapping block 24 of the transmitter 12, and may then transmit this steering matrix to the transmitter 12. Of course, if the receiver 16 uses the matrix equalizer coefficients, the controller 40 or the steering matrix calculation unit 48 may transpose these coefficients to develop the steering matrix for the transmitter 12.

The use of a beamforming technique using information pertaining to a matrix equalizer of a receiver can, in certain instances, significantly reduce the computational complexity needed to perform the steering matrix calculations, as well as reduce the amount of feedback required to perform beamsteering, as less CSI may need to be sent from the receiver to the transmitter. In many cases, steering based on the matrix equalizer of a receiver can give almost the same performance as beamforming to all the receiver antennas using standard beamforming techniques while significantly reducing the computation complexity and thereby increasing the speed of the transmit system and/or reducing the hardware complexity of the transmit system.

It will be understood that the actual beamforming or steering matrix equations, e.g., the computation of the steering matrix, may be performed at any desired location within the wireless communication system 10 of FIG. 1, including within the controller 20 or other hardware, software, or firmware of the transmitter 12, as well as within the controller 40 or other hardware, software, or firmware of the receiver 16. In the later case, the receiver 16 may compute the steering matrix to be used by the transmitter 12 based on the matrix equalizer and, if desired, the CSI developed by the receiver 16, and may send the actual steering matrix to the transmitter 12 to be used in transmitting information to the receiver 16. On the other hand, the steering matrix for the transmitter space-time mapping block 24 of FIG. 1 may be calculated by the steering matrix calculation unit 28 within the transmitter 12 based on matrix equalizer information for the receiver 16 and possibly the CSI provided and sent back from the receiver 16 to the transmitter 12.

Figure 4:
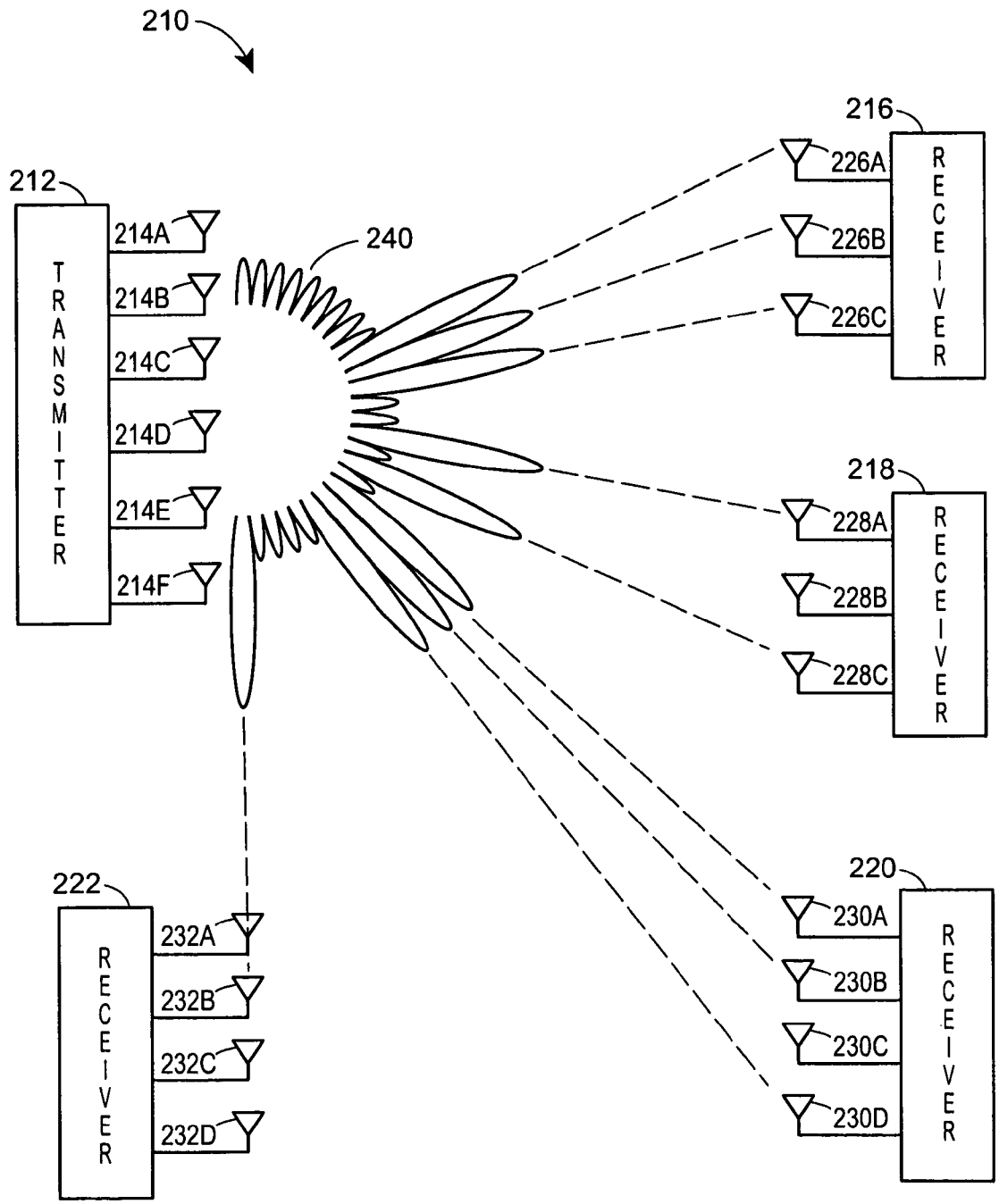
FIG. 4 is a block diagram illustrating a transmit gain pattern for wireless communications between a single transmitter and multiple receivers, wherein the transmitter performs beamforming using information pertaining to one or more of the matrix equalizers of the transmitter or one or more of the multiple receivers.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. For example, FIG. 4 illustrates a MIMO system 210 in which a single transmitter 212 having multiple (in this example six) transmission antennas 214A-214F transmits to multiple receivers 216, 218, 220 and 222, each having multiple receiver antennas 226A-226C, 228A-228C, 230A-230D, and 232A-232D, respectively. While shown in this example as including three or four receiver antenna, any or all of the receivers 216, 218, 220, 222 of FIG. 4 could include different numbers of receiver antennas, including only a single receiver antenna if so desired. In any event, as illustrated by the transmit gain pattern 240 illustrated in FIG. 4, the steering matrix calculated and used by the transmitter 212 is formed using the matrix equalizer outputs or coefficients of multiple ones of the receivers 216, 218, 220 and 222.

In this case illustrated in FIG. 4, the transmitter steering matrix is calculated or determined using the matrix equalizer outputs for each of the receivers 216, 218, 220 and 222, so that, as shown by the transmit gain pattern 240, a high gain lobe is directed to at least one receiver antenna of each of the receivers 216, 218, 220, 222 at the same time. However, the steering matrix need not necessarily produce a high gain lobe directed to all of the receiver antennas of each of the receivers 216, 218, 220, 222, and not necessarily to all of the receiver antennas for any particular one of the receivers 216, 218, 220, 222. Thus, as illustrated in FIG. 4, the steering matrix for the transmitter 212 is determined in such a manner that a separate high gain lobe is directed to each of the receiver antennas 226A, 226B, 226C, 228A, 228C, 230A, 230B and 230D. However, due to the physical location of the receiver 222 and its antennas with respect to the transmitter 212, a single high gain lobe is directed to the receiver antennas 232A-232D, resulting in a single high gain lobe in the transmit gain pattern 240 directed to all of these receiver antennas On the other hand, the transmitter 212 may develop a different steering matrix for each of the receivers 216, 218, 220 and 222 using information pertaining to the different matrix equalizers of each of these receivers, and may use those steering matrixes to beamform to the separate or different receivers at different times or using different channels, e.g., OFDM channels, of the system.

While, in many cases, it will be desirable to beamform in such a way to direct a high gain lobe to at least one receiver antenna from each receiver, it may not be necessary to implement this requirement in all cases. For example, a particular receiver may be in a direct line of sight from the transmitter to another receiver and therefore may be disposed in a high gain region of the transmitter and may thus adequately receive the transmitted signals from the transmitter without having the matrix equalizer for that receiver used to develop the steering matrix. As another example, a particular receiver may be disposed in a low gain region associated with the transmitter, but may be disposed relatively close to the transmitter so that the particular receiver adequately receives the signals transmitted by the transmitter without having the matrix equalizer for that receiver considered when developing the steering matrix for the transmitter. Of course, if desired, the number and location (identity) of the receivers used in calculating the transmitter steering matrix can be determined in any manner, including by trial and error, in determining an acceptable or optimal steering matrix using matrix equalizers from more than one receiver. Still further, while the maximum gains of the high gain lobes of each of the transmit gain patterns shown in FIGS. 3 and 4 are shown as being the same, the steering matrix calculation units 28 and 48 may develop steering matrixes which produce high gain lobes with differing maximum gains.

While the beamforming and steering matrix calculations described herein are described in one example as being implemented in software stored in, for example, one of the memories 21, 41 and implemented on a processor associated with one or both of the controllers 20, 40 or the steering matrix calculation units 28, 48 of the MIMO communication system 10 of FIG. 1, these routines may alternatively or additionally be implemented in digital or analog hardware, firmware, application specific integrated circuits, etc., as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

The present invention may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 5A-5H, various exemplary implementations of the present invention are shown.

Figure 5A:
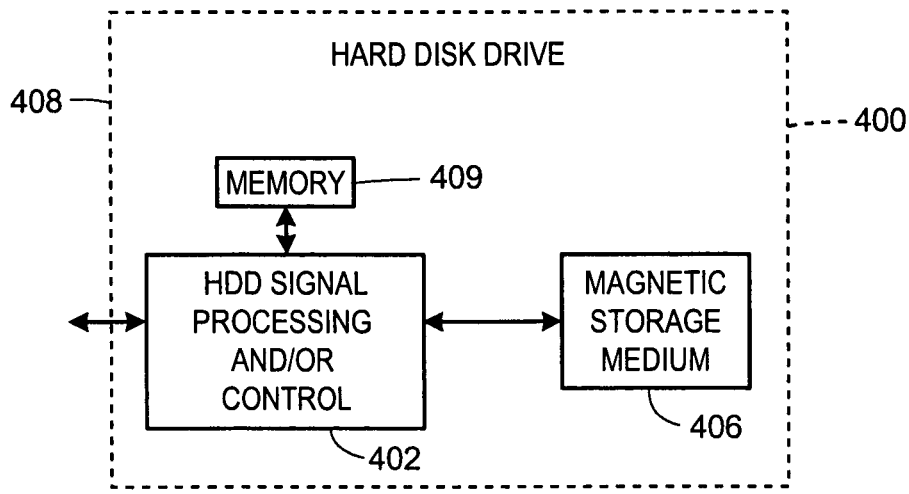
FIGS. 5A-5H illustrate examples of various different devices in which a wireless communication system implementing the beamforming techniques described herein may be used.

Referring to FIG. 5A, the present invention may be used with a hard disk drive 400 which includes both signal processing and/or control circuits, which are generally identified in FIG. 5A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408 which may implement the beamforming techniques described above. HDD 400 may be connected to memory 409, such as random access memory (RAM), a low latency nonvolatile memory such as flash memory, read only memory (ROM) and/or other suitable electronic data storage.

Figure 5B:
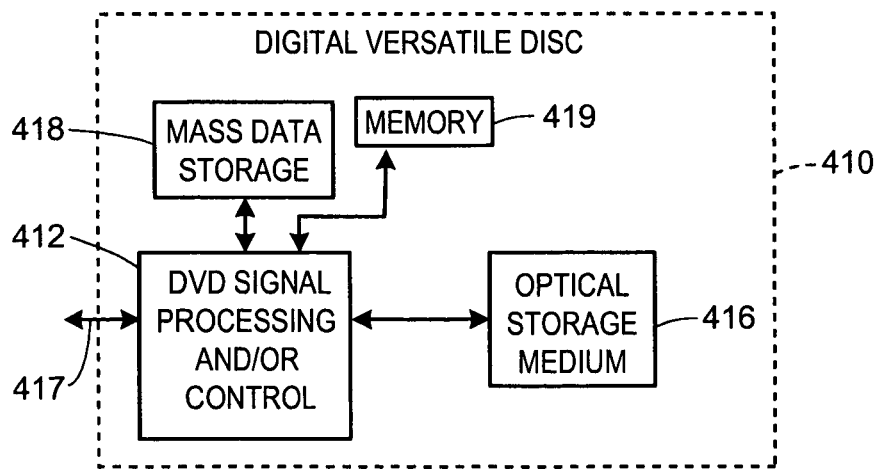

Referring now to FIG. 5B, the present invention may be embodied in or used with a digital versatile disc (DVD) drive 410 which may include either or both signal processing and/or control circuits, which are generally identified in FIG. 5B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417 which may be implemented using the beamforming techniques described above. DVD 410 may communicate with mass data storage 418 that stores data in a nonvolatile manner. Mass data storage 418 may include a hard disk drive (HDD) such as that shown in FIG. 5A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

Figure 5C:
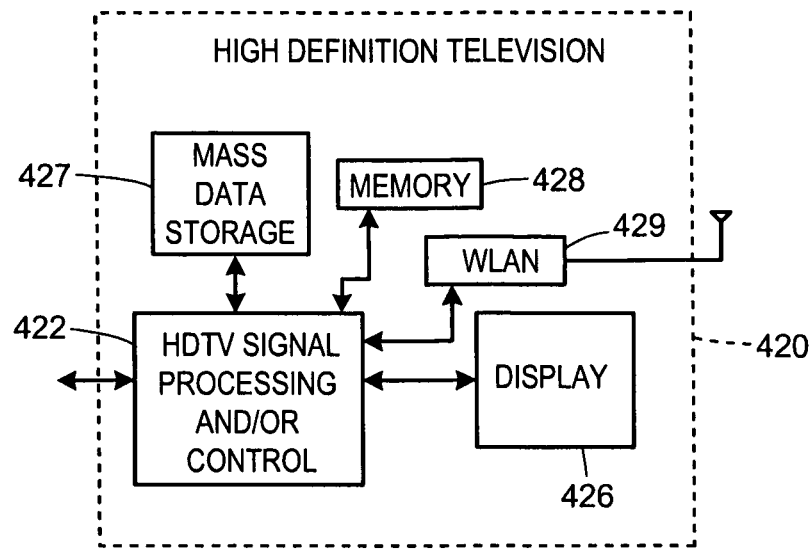

Referring now to FIG. 5C, the present invention may be embodied in a high definition television (HDTV) 420 which may include either or both signal processing and/or control circuits, which are generally identified in FIG. 5C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 5A and/or at least one DVD may have the configuration shown in FIG. 5B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429 which may implement the beamforming techniques described above.

Figure 5D:
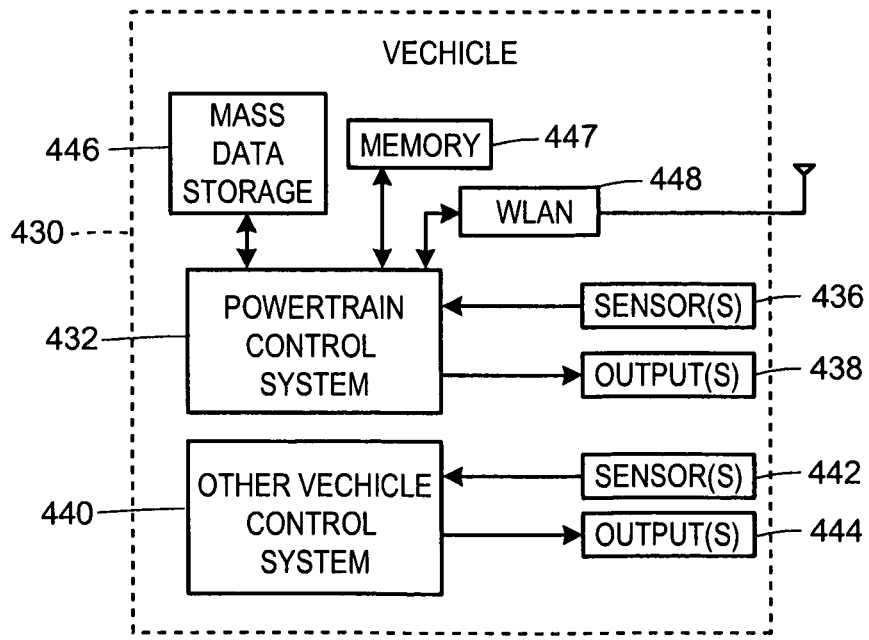

Referring now to FIG. 5D, the present invention may be used in conjunction with a control system of a vehicle 430 having a WLAN interface and/or mass data storage. In some implementations, the present invention may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448 which may implement the beamforming techniques described above. The control system 440 may also include mass data storage, memory and/or a WLAN interface (all not shown).

Figure 5E:
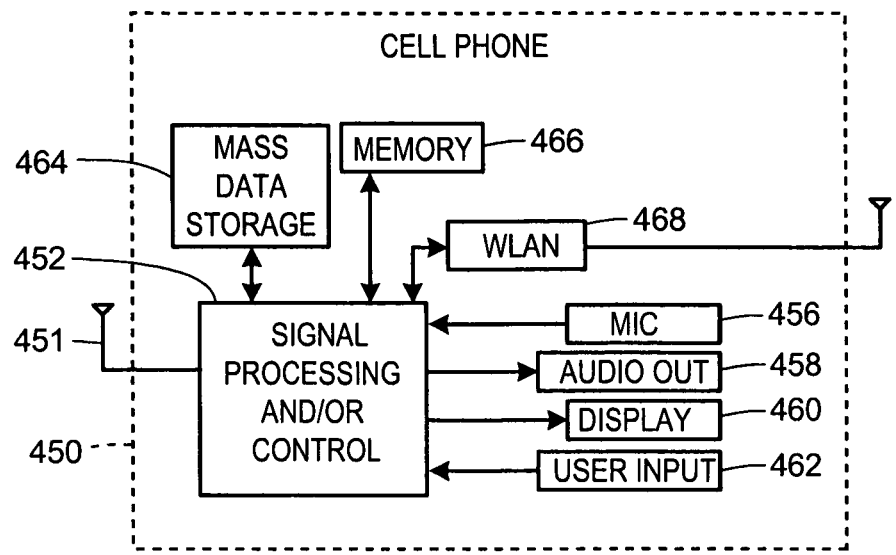

Referring now to FIG. 5E, the present invention may be embodied in a cellular phone 450 that may include one or more cellular antennas 451, either or both signal processing and/or control circuits, which are generally identified in FIG. 5E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 5F:
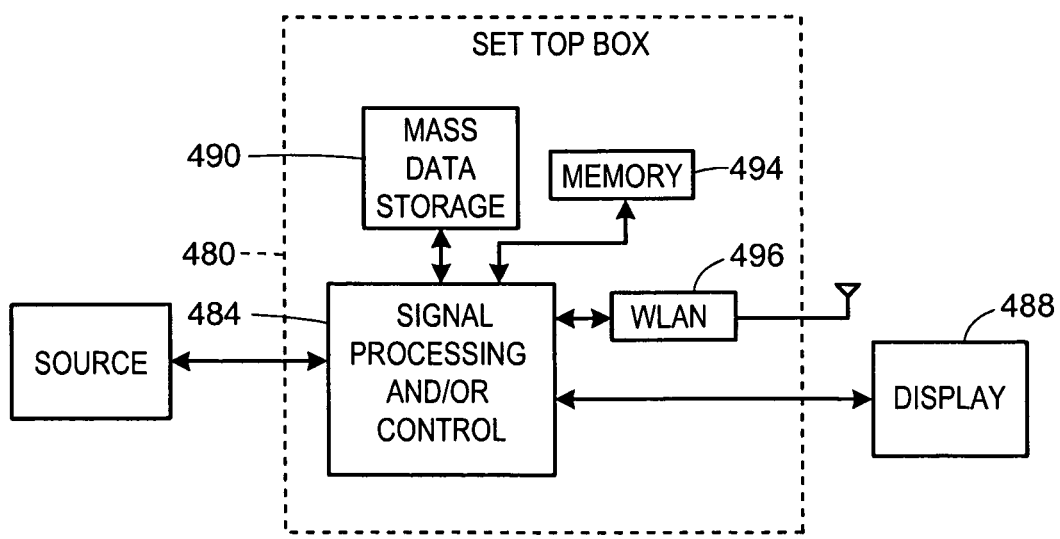

Referring now to FIG. 5F, the present invention may be embodied in a set top box 480 including either or both signal processing and/or control circuits, which are generally identified in FIG. 5F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496 which may implement the beamforming techniques described herein.

Figure 5G:
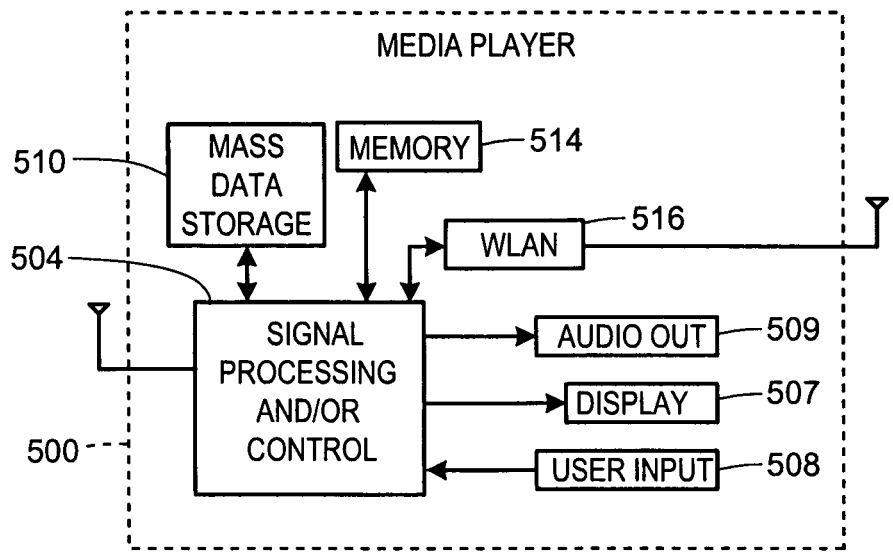

Referring now to FIG. 5G, the present invention may be embodied in a media player 500. The present invention may implement either or both signal processing and/or control circuits, which are generally identified in FIG. 5G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 which may implement the beamforming techniques described herein. Still other implementations in addition to those described above are contemplated.

Figure 5H:
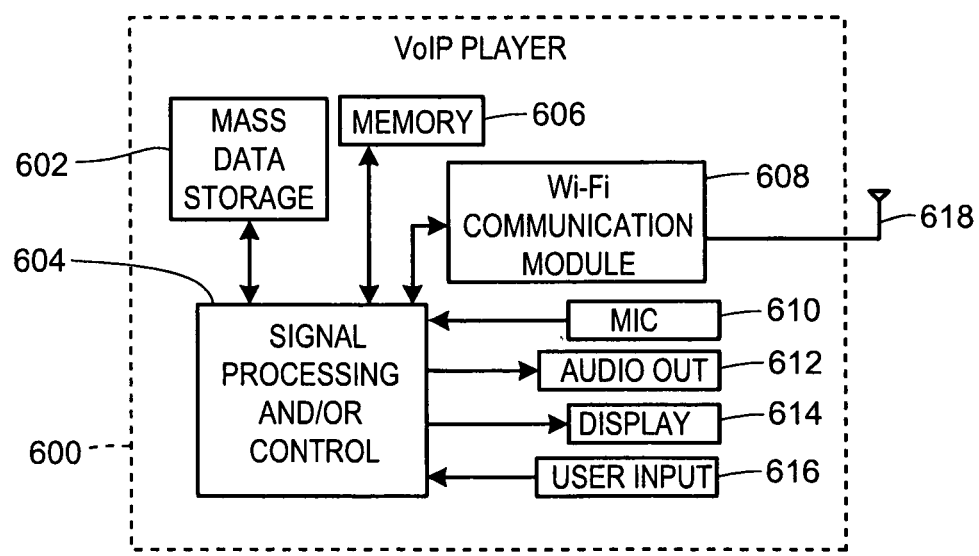

Referring to FIG. 5H, the present invention may be embodied in a Voice over Internet Protocol (VoIP) phone 600 that may include one or more antennas 618, either or both signal processing and/or control circuits, which are generally identified in FIG. 5H at 604, and a wireless interface and/or mass data storage of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 602 that stores data in a nonvolatile manner such as optical and/or magnetic storage devices, for example hard disk drives HDD and/or DVDs. At least one HDD may have the configuration shown in FIG. 5A and/or at least one DVD may have the configuration shown in FIG. 5B. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the beamforming techniques described herein.

Moreover, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of wirelessly transmitting an information signal within a communication system having a transmitter with a plurality of transmission antennas and one or more receivers, the method comprising:
   developing, using a matrix equalizer coefficient generator, equalizer coefficients for processing received signals;
   modulating the information signal to produce a modulated signal;
   providing the modulated signal to the plurality of transmission antennas for transmission to the one or more receivers;
   developing a steering matrix at least by transposing a matrix having equalizer coefficients developed using the matrix equalizer coefficient generator; and
   controlling the transmission of the modulated signal via the transmission antennas using the steering matrix.

2. The method of claim 1, wherein the matrix equalizer coefficient generator is disposed at the transmitter.

3. The method of claim 1, wherein:
   the matrix equalizer coefficient generator is disposed at one of the one or more receivers;
   the method further comprises receiving, at the transmitter, equalizer coefficients developed using the matrix equalizer coefficient generator disposed at the one receiver; and
   developing the steering matrix is performed at the transmitter.

4. The method of claim 1, wherein:
   the matrix equalizer coefficient generator is disposed at one of the one or more receivers;
   developing the steering matrix is performed at the one receiver; and
   the method further comprises receiving, at the transmitter, the steering matrix sent from the one receiver.

5. The method of claim 1, wherein:
   the method further comprises receiving, at the transmitter, equalizer coefficients developed by multiple matrix equalizer coefficient generators disposed at multiple ones of the one or more receivers and sent from the multiple ones of the one or more receivers; and
   developing the steering matrix is performed at the transmitter.

6. The method of claim 5, further comprising:
   developing respective steering matrices at least by transposing respective matrices having respective sets of equalizer coefficients developed using respective matrix equalizer coefficient generators of respective multiple ones of the one or more receivers; and
   wherein controlling the transmission of the modulated signal comprises using the respective steering matrices at different times or in different channels to beamform to the multiple ones of the one or more receivers.

7. The method of claim 5, wherein:
   the matrix having equalizer coefficients includes equalizer coefficients developed using the matrix equalizer coefficient generators of each of the multiple ones of the one or more receivers; and
   controlling the transmission of the modulated signal comprises using the single steering matrix to simultaneously beamform to the multiple ones of the one or more receivers.

8. The method of claim 1, wherein the steering matrix is developed to produce a beam pattern having one or more high gain lobes in the direction of the one or more receivers.

9. A wireless transmitter for transmitting an information signal to a plurality of receiver antennas associated with one or more receivers, the wireless transmitter comprising:
   a signal modulator configured to modulate the information signal to produce a modulated signal;
   a multiplicity of transmission antennas;
   a beamforming network coupled between the signal modulator and the multiplicity of transmission antennas;
   a controller coupled to the beamforming network, the controller configured to control the beamforming network using a steering matrix so as to produce a transmit gain pattern having one or more high gain lobes when the modulated signal is transmitted via the multiplicity of transmission antennas;
   a matrix equalizer having a matrix equalizer coefficient generator; and a steering matrix calculation unit configured to develop the steering matrix at least by transposing a matrix having equalizer coefficients developed using the matrix equalizer coefficient generator.

10. The wireless transmitter of claim 9, further including a housing and wherein the steering matrix calculation unit, the controller, the signal modulator and the matrix equalizer are disposed within the housing.

11. A wireless communication system, comprising:
- a transmitter having a plurality of transmission antennas;
- one or more receivers;
- a multiplicity of receiver antennas associated with the one or more receivers;
- a signal modulator disposed within the transmitter and adapted to modulate an information signal to produce a modulated signal;
- a beamforming network coupled between the signal modulator and the plurality of transmission antennas;
- a controller coupled to the beamforming network, the controller configured to control the beamforming network using a steering matrix so as to produce a transmit gain pattern based on the steering matrix when the modulated signal is transmitted via the plurality of transmission antennas;
- a matrix equalizer disposed in the transmitter or one of the receivers, the matrix equalizer configured to perform matrix equalization on a received signal, the matrix equalizer having a matrix equalizer coefficient generator; and
- a steering matrix calculation unit configured to develop the steering matrix at least by transposing a matrix having equalizer coefficients developed using the matrix equalizer coefficient generator.

12. The wireless communication system of claim 11, wherein the steering matrix calculation unit and the matrix equalizer are disposed within the transmitter.

13. The wireless communication system of claim 11, wherein the steering matrix calculation unit and the matrix equalizer are disposed within one of the one or more receivers.

14. The wireless communication system of claim 11, wherein the steering matrix calculation unit is disposed within the transmitter and the matrix equalizer is disposed within one of the one or more receivers.

15. A beamforming system for use in a wireless communication system having a transmitter with multiple transmission antennas and one or more receivers having a plurality of receiver antennas, the beamforming system comprising:
- a computer readable memory;
- a routine stored on the computer readable memory for execution on a processor (i) to determine a steering matrix at least by transposing a matrix having equalizer coefficients developed using a matrix equalizer coefficient generator, and (ii) to apply the steering matrix to a signal to be transmitted via the multiple transmission antennas, wherein the matrix equalizer coefficient generator is disposed within the transmitter or one of the receivers.

16. The beamforming system of claim 15, wherein the routine determines the steering matrix using equalizer coefficients developed by matrix equalizer coefficient generators of multiple ones of the receivers.

17. The beamforming system of claim 16, wherein the routine (i) develops respective steering matrices at least by transposing respective matrices having respective sets of equalizer coefficients developed by each of multiple ones of the matrix equalizer coefficient generators and (ii) uses the respective steering matrixes at different times or in different channels to beamform to the multiple ones of the receivers.

18. The beamforming system of claim 16, wherein the routine (i) develops a single steering matrix at least by transposing a matrix having equalizer coefficients developed by the matrix coefficient generators and (ii) uses the single steering matrix to simultaneously beamform to the multiple ones of the receivers.

* * * * *